Patented Dec. 25, 1945

2,391,775

UNITED STATES PATENT OFFICE 2,391,775

PROCESSING OF HYDROCARBONS

Eric William Musther Fawcett and Eric Sylvester Narracott, Sunbury-on-Thames, England, assignors to Anglo-Iranian Oil Company Limited, London, England, a British joint-stock corporation No Drawing. Application November 19, 1942, Serial No. 466,190. In Great Britain September 26, 1941

4 Claims. (Cl. 260—683.5)

This invention relates to the conversion of normal aliphatic hydrocarbons such as n-butane or n-pentane or materials containing substantial proportions of one or more such hydrocarbons, wholly or in part into the corresponding branched chain hydrocarbons such as isobutane and isopentane, or into mixtures containing substantial proportions of branched chain hydrocarbons of lower molecular weight, for example the conversion of n-pentane into isobutane.

In such a process it is usual to employ as contact catalysts certain anhydrous metallic halides such as aluminium chloride, while in order to obtain a sufficiently high conversion rate it is usually found necessary to employ an activating agent such as hydrogen chloride or water in addition to the metallic halide.

The invention has among its objects to accelerate the rate of conversion, to prolong the life of the catalyst and generally to improve the efficiency of the process.

It is known that water exerts a hydrolytic action on aluminium chloride and that while the presence of water serves initially to activate the aluminium chloride as a catalyst in such a process, it causes rapid hydrolysis of the catalyst, whereby the activity of the catalyst ultimately decreases substantially. We have found that in the use of an hydrogen halide as a catalyst activator, in the complete absence of water, the activity of the catalyst is low and that to maintain maximum activity it is necessary to control both the hydrogen halide and the water content of the hydrocarbon stream, and that in the presence of a determined concentration of water and hydrogen halide not only is an aluminium chloride catalyst highly active for the reaction but its life also is great.

We have found that the catalyst activity is markedly dependent upon the amounts of water and hydrogen halide added, and that in all cases maximum activity for any given amount of hydrogen halide is always obtained when the value of the ratio of concentration of hydrogen halide and water lies between certain limits.

According to the invention the molecular concentration ratio of water to hydrogen chloride is within the limits of 0.0001 and 0.01.

In general the higher the concentration of hydrogen chloride used, (expressed as parts by weight on the hydrocarbon feedstock), the greater the conversion rate, provided that the water concentration is adjusted to provide a molecular concentration ratio between the limits indicated; but at an upper concentration limit of the hydrogen chloride further increase of hydrogen chloride is found to be ineffective in increasing the conversion rate. This upper concentration limit when hydrogen chloride is used corresponds in operation at atmospheric pressure to approximately 30% by weight of hydrogen chloride on the hydrocarbon feedstock.

The invention comprises the conditions hereinafter described.

In carrying the invention into effect the actual concentration of the hydrogen halide to be used depends on a number of factors, but mainly on the operating pressure. Thus the higher the operating pressure the lower the hydrogen chloride concentration expressed in relation to the hydrocarbon throughput required for effective catalyst activation. Furthermore, at atmospheric pressure some 5% by weight of hydrogen chloride would be sufficient for effective use in the isomerisation of n-butane or n-pentane, while when operating at a pressure of 10 atmospheres, equivalent results would be obtained using 0.5% or less of hydrogen chloride.

In view of the great ease with which the aluminium halides absorb water from the atmosphere, it is possible that a batch of an aluminium halide catalyst as placed in the reaction vessel may be extensively hydrolysed, particularly at the surface layers. Since the hydrolysis products can react with hydrogen chloride to yield water, the water content of the reaction system may actually exceed the concentration with which optimum catalytic activity is obtainable at the outset with any given amount of hydrogen halide, without the addition of any water with the feedstock. It may thus be advantageous therefore, when commencing operation with a fresh batch of catalyst, to work in the absence of added water, that is with the hydrogen halide alone. In this way water fortuitously introduced with the catalyst is expelled, and after a preliminary conditioning in this manner to establish a molecular concentration ratio within the limits indicated, normal operation with optimum water and hydrogen chloride concentrations may then proceed.

The process according to the invention may advantageously be carried out in the vapour phase in batch or continuous operation.

In the preferred manner of operation, a continuous stream of a mixture of the hydrocarbon raw material, hydrogen chloride and water in a concentration within the limits hereinbefore indicated is passed through a reaction vessel containing the aluminium halide catalyst in the form of granules or other form such for example as in admixture with or supported on a porous carrier, the reaction vessel being maintained at a determined temperature and pressure.

The reaction is carried out at an elevated temperature not exceeding 300° C. and advantageously in the temperature range 50° C.–200° C. Superatmospheric pressures not exceeding 100 atmospheres and advantageously of about 10 atmospheres may be employed.

The product leaving the reaction vessel and containing substantial proportions of branched chain hydrocarbons may be fractionated, for example by distillation, in order to separate partially or completely the unreacted normal hydrocarbon and the branched chain hydrocarbon product, the unreacted normal hydrocarbon being advantageously re-cycled to the same or other reaction vessel.

It may be that under the conditions hereinbefore described the optimum catalyst surface is not actually that of aluminium chloride, but that of a partially hydrolysed surface containing both chloride and hydroxyl groups. The catalyst surface under these conditions is maintained constantly of the optimum composition by control of the hydrogen chloride and water ratio. Thus once the optimum surface concentration has been reached by treatment of the catalyst with the concentrations of water and hydrogen chloride within the prescribed limits referred to, high activity is maintained in the presence of the materials processed, provided that water and hydrogen chloride are then both totally absent.

Owing to the difficulty of ensuring the complete absence of water over extended periods in a commercial scale plant, a proportion of hydrogen halide may be added in the course of the reaction to maintain activity at the optimum value.

*Example 1.*—The following experiments illustrate the effect on conversion rate of varying the hydrogen chloride-water ratio in a butane isomerisation process using an aluminium chloride catalyst.

(a) A stream of n-butane containing 11.5% by weight of hydrogen chloride and no water was passed at a rate equivalent to 13.6 gas volumes per volume of catalyst per hour, through a reaction vessel containing lump aluminium chloride at 123° C. and atmospheric pressure. The product stream contained 17.4% of isobutane.

(b) The same butane-hydrogen chloride stream containing a partial pressure of water vapour of 1 mm. of mercury, corresponding to a molecular ratio of water to hydrogen of 0.0077, was processed under identical conditions and gave a conduct containing 25.6% isobutane.

(c) The water vapour pressure was 1.5 mm. mercury, corresponding to a molecular ratio of water to hydrogen chloride of 0.0115, and the product stream contained 22.0% isobutane.

(d) Finally the procedure was repeated using a water vapour partial pressure of about 0.15 mm. of mercury, corresponding to a molecular ratio of water to hydrogen chloride of 0.00115, and the product was found to contain 35.0% of isobutane.

*Example 2.*—A n-butane stream containing 1.5% by volume of hydrogen chloride and a water concentration equivalent to 0.3 mm. of mercury partial pressure, corresponding to a molecular ratio of water to hydrogen chloride of 0.026, was passed over aluminium chloride at 123° C. and atmospheric pressure, at a flow rate equivalent to 13.6 gas volumes per volume of catalyst per hour. The product contained 1.7% isobutane. These conditions represent a higher water-hydrogen chloride ratio than the optimum value, and the effect of the excess water was now progressively eliminated by passage of the same butane-hydrogen chloride stream in the absence of water. The product composition was determined at intervals with the following results:

| Time after removal of water from stream (hr.) | Product composition (percent isobutane) |
| --- | --- |
| 0.5 | 2.8 |
| 1 | 2.4 |
| 2.0 | 2.0 |
| 2.5 | 8.8 |
| 3.0 | 3.6 |
| 5.0 | 2.1 |

The maximum value observed in the isobutane content of the product demonstrates that an optimum water-hydrogen chloride ratio exists for maximum reaction rate.

Hydrogen chloride is the hydrogen halide the use of which is preferred. Other hydrogen halides may however be used, and corresponding proportion used, allowance being made for the different molecular weights.

We claim:

1. A process for the conversion of normal aliphatic hydrocarbons into branched chain hydrocarbons by the use of an anhydrous metallic halide such as aluminium chloride as contact catalyst and a hydrogen halide such as hydrogen chloride and water as catalyst activating agents, in which the molecular concentration ratio of water to hydrogen chloride present in the feedstock is within the limits of 0.0001 and 0.01.

2. A process as specified in claim 1, in which when at the outset the water content introduced into the reaction system with the catalyst actually exceeds the determined proportion of water to be added to the feedstock only the hydrogen halide is added to the feedstock until the water having been thus expelled normal operation then proceeds by the admission of the hydrogen halide and water together in a molecular concentration ratio within the said limits.

3. A process as specified in claim 1 carried out at atmospheric pressure and at an elevated temperature in the range 50—200° C. or higher but not exceeding 300° C. in the use of hydrogen chloride in a proportion of about 5% by weight or less, reckoned on the hydrocarbon throughput.

4. A process as specified in claim 1 carried out at a superatmospheric pressure of 10 atmospheres, and at an elevated temperature in the range 50–200° C. or higher but not exceeding 300° C. in the use of hydrogen chloride in a proportion of about .5% by weight or less, reckoned on the hydrocarbon throughput.

ERIC WILLIAM MUSTHER FAWCETT.
ERIC SYLVESTER NARRACOTT.